(12) United States Patent
Wu et al.

(10) Patent No.: US 8,718,603 B2
(45) Date of Patent: *May 6, 2014

(54) METHOD AND SYSTEM FOR REMOTE CONTROL OF A SMART CARD

(75) Inventors: Chuanxi Wu, Shenzhen (CN); Jingwang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 86 days.

This patent is subject to a terminal disclaimer.

(21) Appl. No.: 13/258,796

(22) PCT Filed: Dec. 23, 2009

(86) PCT No.: PCT/CN2009/075893
§ 371 (c)(1),
(2), (4) Date: Feb. 28, 2012

(87) PCT Pub. No.: WO2011/022914
PCT Pub. Date: Mar. 3, 2011

(65) Prior Publication Data
US 2012/0149333 A1    Jun. 14, 2012

(30) Foreign Application Priority Data

Aug. 28, 2009    (CN) .......................... 2009 1 0171737

(51) Int. Cl.
*H04M 11/00* (2006.01)
(52) U.S. Cl.
USPC ........ 455/408; 455/414.1; 455/418; 455/466; 379/161; 379/168; 379/48; 709/203; 709/210; 709/223; 713/193; 713/194; 726/17; 726/27; 726/35; 726/36; 340/426.18; 340/438; 340/5.8; 370/270; 370/328

(58) Field of Classification Search
USPC ................ 455/404.2, 410, 414.1, 421, 432.1, 455/456.1, 418, 422.1, 432.3, 435.1, 466; 370/328–338, 270; 379/161, 168, 184, 379/194, 48, 201.02; 709/203, 210, 223; 713/193, 194; 726/4, 17, 27, 23, 35, 726/36; 340/426.1, 438, 507, 541, 5.8, 6.1
See application file for complete search history.

(56) References Cited

U.S. PATENT DOCUMENTS 5,600,708 A * 2/1997 Meche et al. ................. 455/411
5,898,783 A * 4/1999 Rohrbach .................... 340/5.31

(Continued)

FOREIGN PATENT DOCUMENTS

CN    1533207 A    9/2004
CN    1568069 A    1/2005

(Continued)

OTHER PUBLICATIONS

International Search Report in international application No. PCT/CN2009/075893, mailed on Jun. 3, 2010.

(Continued)

*Primary Examiner* — Quan M Hua
(74) *Attorney, Agent, or Firm* — Oppedahl Patent Law Firm LLC

(57) ABSTRACT

The present application discloses a method and system for remote control of a smart card. The method includes: a smart card management platform receives a request to destroy the smart card from a subscriber (S101); according to the request, the smart card management platform performs interactive processing with a terminal side via a mobile network platform to make the terminal side destroy the smart card (S103). The present application enables the subscriber to avoid loss when the terminal is robbed, lost, stolen, or is illegally used seriously, and provide a higher flexibility to the payment system.

7 Claims, 9 Drawing Sheets

(56) References Cited

U.S. PATENT DOCUMENTS

| | | | |
|---|---|---|---|
| 6,542,730 B1* | 4/2003 | Hosain | 455/410 |
| 6,662,023 B1* | 12/2003 | Helle | 455/558 |
| 7,336,974 B2 | 2/2008 | Choi | |
| 2002/0069259 A1 | 6/2002 | Kushwaha et al. | |
| 2004/0192388 A1 | 9/2004 | Dupuis et al. | |
| 2005/0153742 A1 | 7/2005 | Choi | |
| 2006/0154663 A1 | 7/2006 | Son et al. | |
| 2008/0070590 A1 | 3/2008 | Miyajima et al. | |
| 2009/0075630 A1 | 3/2009 | McLean | |
| 2010/0015942 A1 | 1/2010 | Huang et al. | |
| 2010/0210240 A1* | 8/2010 | Mahaffey et al. | 455/411 |
| 2012/0149331 A1* | 6/2012 | Wu et al. | 455/411 |
| 2012/0149332 A1* | 6/2012 | Wu et al. | 455/411 |
| 2012/0149357 A1* | 6/2012 | Wu et al. | 455/419 |

FOREIGN PATENT DOCUMENTS

| | | |
|---|---|---|
| CN | 1780485 A | 5/2006 |
| CN | 1810052 A | 7/2006 |
| CN | 1819705 A | 8/2006 |
| CN | 1930901 A | 3/2007 |
| CN | 1941958 A | 4/2007 |
| CN | 1980459 A | 6/2007 |
| CN | 101018375 A | 8/2007 |
| CN | 101309518 A | 11/2008 |
| CN | 101499190 A | 8/2009 |
| EP | 1170969 A1 | 1/2002 |
| EP | 1220556 A1 | 7/2002 |
| EP | 2129146 * | 12/2009 |
| JP | 5-89004 A | 4/1993 |
| JP | 2001-268216 A | 9/2001 |
| JP | 2002-259869 A | 9/2002 |
| JP | 2003070063 A | 3/2003 |
| JP | 2003219043 A | 7/2003 |
| JP | 2004-297156 A | 10/2004 |
| JP | 2004-348475 A | 12/2004 |
| JP | 2005-57366 A | 3/2005 |
| JP | 2005167463 A | 6/2005 |
| JP | 2006-60685 A | 3/2006 |
| JP | 2006-261990 A | 9/2006 |
| JP | 2006524019 A | 10/2006 |
| JP | 2006-352461 A | 12/2006 |
| JP | 2007-116716 A | 5/2007 |
| JP | 2007-521739 A | 8/2007 |
| JP | 2008-500754 A | 1/2008 |
| JP | 2008109306 A | 5/2008 |
| WO | 03/094562 A1 | 11/2003 |
| WO | 2004/114698 A1 | 12/2004 |
| WO | WO/2008/092336 * | 8/2008 |

OTHER PUBLICATIONS

English Translation of the Written Opinion of the International Search Authority in international application No. PCT/CN2009/075893, mailed on Jun. 3, 2010.

International Search Report in international application No. PCT/CN2009/075882, mailed on May 27, 2010.

English Translation of the Written Opinion of the International Search Authority in international application No. PCT/CN2009/075882, mailed on May 27, 2010.

International Search Report in international application No. PCT/CN2009/075888, mailed on Jun. 3, 2010.

English Translation of the Written Opinion of the International Search Authority in international application No. PCT/CN2009/075888, mailed on Jun. 3, 2010.

* cited by examiner

METHOD AND SYSTEM FOR REMOTE CONTROL OF A SMART CARD

TECHNICAL FIELD

The present application relates to a smart card technology, and in particular to a method and system for remote control of a smart card.

BACKGROUND

Electronic payment refers to the circulation and payment of funds realized in a computer network system in the form of electronic data storage and transfer by taking commercial electronic tools and various kinds of electronic money as media, and taking computer and communication technology as a means.

With the combination of Internet, mobile communication and computer and the other technologies in recent years, mobile payment on behalf of mobile electronic commerce emerges as the times require. As an emerging electronic payment manner, the mobile payment is advantaged in that it can be carried out anytime and anywhere, conveniently and fast, and its cost is low, etc. As long as a consumer has a mobile phone, the consumer can complete financing or trading, and enjoy the convenience brought by the mobile payment. Nowadays, the mobile payment is becoming a new highlight in electronic commerce.

In addition, a recent survey shows that 82% respondents are worried that if their mobile phones are lost or stolen, someone may carry out fraud by making use of the information stored in these mobile phones (including smart cards). Meanwhile, 90% respondents are worried that their personal data and financial data may be lost after their mobile phones are lost; and 72% respondents admit that the information stored in their mobile phones is very important and irreplaceable. Since subscribers use mobile phones to engage in various different activities, such as electronic payment and the like, it is really a disaster for subscribers if their mobile phones are lost. In this survey, 91% respondents say the loss of mobile phones for electronic payment will bring serious losses to them. Meanwhile, as people increasingly depend on mobile phones, the operator is required to make their own subscribers feel secure. It is good to use mobile phones more widely, however, the mobile operator is required to strengthen the security and management level of personal data information of subscribers in order to nip it in the bud. At present, some solutions have been proposed for the case when mobile phones for electronic payment are lost or stolen. However, these solutions have certain deficiencies, or the processing after a mobile phone for electronic payment is lost or stolen differs greatly from the current payment flow; or due to insufficient security of the system, the payment information of subscribers is still used by others illegally, thus payment is forged; or the system does not deal with the loss of mobile phones timely, which brings huge losses to the subscribers, making the subscribers feel unsecure. At present, no effective solution has been proposed.

SUMMARY

The present application is proposed based on the problems that: the processing after a mobile phone for electronic payment is lost or stolen differs greatly from the current payment flow; or the system is not secure enough, so payment information of a subscriber is still used by others illegally, resulting in forged payment; or the system does not deal with the loss of a mobile phone timely, which brings huge losses to a subscriber, and makes the subscriber feel unsecure. For this purpose, the present application mainly aims to provide a method and system for remote control of a smart card in order to solve the above problems.

To achieve the above purpose, according to one aspect of the present application, a method for remote control of a smart card is provided.

Preferably, a smart card management platform receives a request to destroy a smart card from a subscriber; the smart card management platform performs interactive processing with a terminal side according to the request via a mobile network platform to make the terminal side destroy the smart card.

Preferably, the terminal side may include a mobile station and a smart card.

Preferably, the smart card management platform performing interactive processing with the terminal side may include: if the mobile station at the terminal side is in a normal use status, then the mobile station receives a destroy command sent by the mobile network platform; the mobile station destroys the smart card by executing the destroy command.

Preferably, after the mobile station destroys the smart card, the method may further include: the smart card is in a destroyed status.

Preferably, after the smart card is in a destroy status, the method may further include: the mobile station returns a destroy success message to the mobile network platform.

Preferably, the mobile station executing the destroy command to destroy the smart card may include: the mobile station disables function of the smart card by destroying hardware of the smart card; or, the mobile station disables the function of the smart card by executing a preinstalled software procedure.

Preferably, the method may further include: if the mobile station where the smart card is positioned is in an off-line status, the smart card is updated to an awaiting-destroy status.

Preferably, after the smart card is updated to an awaiting-destroy status, the method may further include: if the mobile station where the smart card is positioned in an off-line status resumes the normal use status and registers with the mobile network platform, the mobile network platform sends the destroy command to the mobile station where the smart card is positioned; and the mobile station executes the destroy command.

Preferably, the off-line status may include: the mobile station is in a turned-off status; the mobile station is not in a service area.

Preferably, after the smart card management platform receives an application from a subscriber, the method may further include: the smart card management platform determines whether the smart card is valid or not.

Preferably, before the smart card management platform performs interactive processing with the terminal side according to the request via the mobile network platform, the method may further include: the mobile network platform and the terminal side perform security authentication.

Preferably, after the smart card management platform receives the request to destroy the smart card from the subscriber, the method may further include: the smart card management platform looks up status information of the mobile station where the smart card is positioned through the mobile network platform.

Preferably, the smart card management platform looking up status information of the mobile station where the smart card is positioned through the mobile network platform may include: the smart card management platform looks up and finds the status information of the mobile station according to a mobile identification code and location regional information of the mobile station via the mobile network platform.

Preferably, destroying the smart card may include: if the smart card is in a destroyed status, the smart card cannot be used permanently.

To achieve the above purpose, according to one aspect of the present application, a method for remote control of a smart card is provided.

The method for remote control of a smart card according to the present application includes: when a smart card supervision platform finds that a subscriber uses a smart card illegally, the smart card supervision platform informs a smart card management platform to destroy the smart card; the smart card management platform performs interactive signaling processing with a terminal side via a mobile network platform to make the terminal side complete the destroying of the smart card.

Preferably, the smart card management platform sending a smart card destroy command to the terminal side via the mobile network platform to perform interactive processing may include: the smart card management platform looks up status information of the mobile station where the smart card is positioned via the mobile network platform; if the mobile station is in a normal use status, then the mobile network platform sends a destroy command to the mobile station; the mobile station executes the destroy command to destroy the smart card.

Preferably, after the mobile station executes the destroy command to destroy the smart card, the method may further include: the mobile station returns a destroy success message to the mobile network platform; the mobile network platform changes a status of the smart card to a destroyed status.

Preferably, the smart card management platform looking up status information of the mobile station where the smart card is positioned via the mobile network platform may include: the smart card management platform looks up and finds status information of the mobile station according to a mobile identification code and location regional information of the mobile station via the mobile network platform.

Preferably, after the smart card management platform looking up status information of the mobile station where the smart card is positioned via the mobile network platform, the method may further include: if the mobile station where the smart card is positioned is in an off-line status, then the mobile network platform updates its status to an awaiting-destroy status.

To achieve the above purpose, according to another aspect of the present application, a system for remote control of a smart card is provided.

The system for remote control of a smart card according to the present application includes: a mobile network platform configured to send a destroy command; and a mobile station configured to execute the destroy command to destroy a smart card.

Preferably, the system may further include: a smart card management platform configured to receive a request from a subscriber and perform signaling interaction with the mobile station via the mobile network platform.

Preferably, the smart card management platform may be further configured to monitor whether the subscriber uses the smart card illegally.

Preferably, the mobile network platform may be further configured to look up status information of the mobile station where the smart card is positioned.

To achieve the above purpose, according to another aspect of the present application, a mobile terminal is provided.

The mobile terminal according to the present application includes: a receiving module configured to receive a request to destroy a smart card; and an executing module configured to execute destroying of the smart card.

Preferably, the mobile terminal may further include: a sending module, configured to send a destroy success message.

To achieve the above purpose, according to another aspect of the present application, a mobile network platform is provided.

The mobile network platform according to the present application includes: a sending module configured to send a destroy command to a mobile station when the mobile station is in a normal use status; an changing module, configured to chang a status of a smart card; an updating module, configured to update a status of the smart card, update the status of the smart card to a destroyed status when the mobile station and the smart card are in an on-line status and the destroy process is successfully executed, and update the status of the smart card to an awaiting-destroy status when the mobile station and the smart card are in an off-line status.

Preferably, the mobile network platform may further include: a notification module, configured to inform the smart card management platform to update a status of the smart card to a destroyed status.

Through the present application, the smart card management platform receives a request to destroy the smart card from a subscriber; according to the request, the smart card management platform performs interactive processing with the terminal side via the mobile network platform to make the terminal side destroy the smart card, therefore solving the problems that: the processing after the mobile phone for electronic payment is lost or stolen differs greatly from the current payment flow; or the system is not secure enough, thus payment information of a subscriber is still used by others illegally, resulting in forged payment; or the system does not deal with the loss of the mobile phone timely, which brings huge losses to a subscriber and makes the subscriber feel unsecure, therefore further avoiding the loss caused when a subscriber terminal for payment is robbed, lost, stolen, or is used illegally seriously, and providing a higher flexibility to the payment system.

DETAILED DESCRIPTION

Considering the problems that: the processing after a mobile phone for electronic payment is lost or stolen differs greatly from the current payment flow; or the system is not secure enough, therefore the payment information of a subscriber is still used by others illegally, which results in forged payment; or the system does not deal with the loss of a mobile phone timely, which brings huge losses to a subscriber and make the subscriber feel unsecure; embodiments of the present application provides a method and system for remote control of a smart card. The method comprises: a smart card management platform receives a request to destroy a smart card from a subscriber; according to the request, the smart card management platform performs interactive processing with a terminal side via a mobile network platform to make the terminal side destroy the smart card.

It should be noted that, if no conflict is caused, the embodiments in the application and the features in the embodiments can be combined with each other. The present application is described below with reference to the accompanying drawings and embodiments in detail.

According to an embodiment of the present application, a method for remote control of a smart card is provided.

Figure 1:
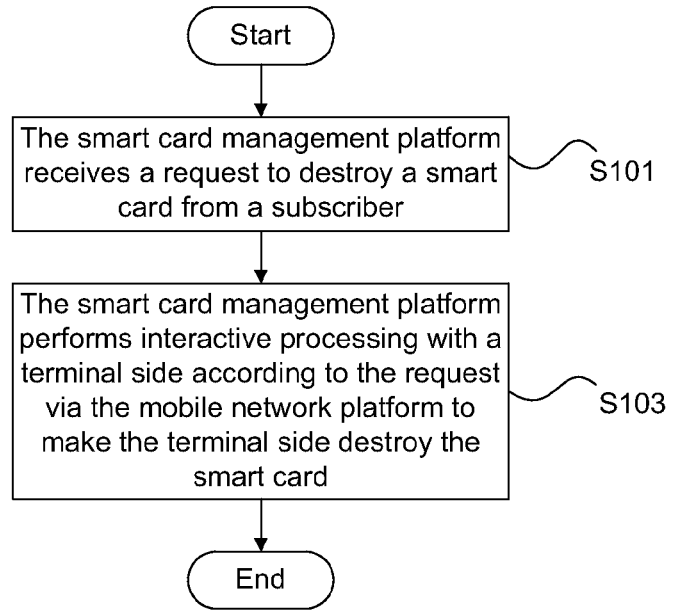
FIG. 1 shows a flowchart of a method for remote control of a smart card according to an embodiment of the present application.

FIG. 1 shows a flowchart of the method for remote control of a smart card according to the embodiment of the present application.

As shown in FIG. 1, the method comprises the following step S101 to step S103:

step S101: a smart card management platform receives a request to destroy a smart card from a subscriber; and step S103: according to the request, the smart card management platform performs interactive processing with a terminal side via a mobile network platform to make the terminal side destroy the smart card.

The implementation process of this embodiment of the present application is described below with reference to examples in detail.

Figure 3:
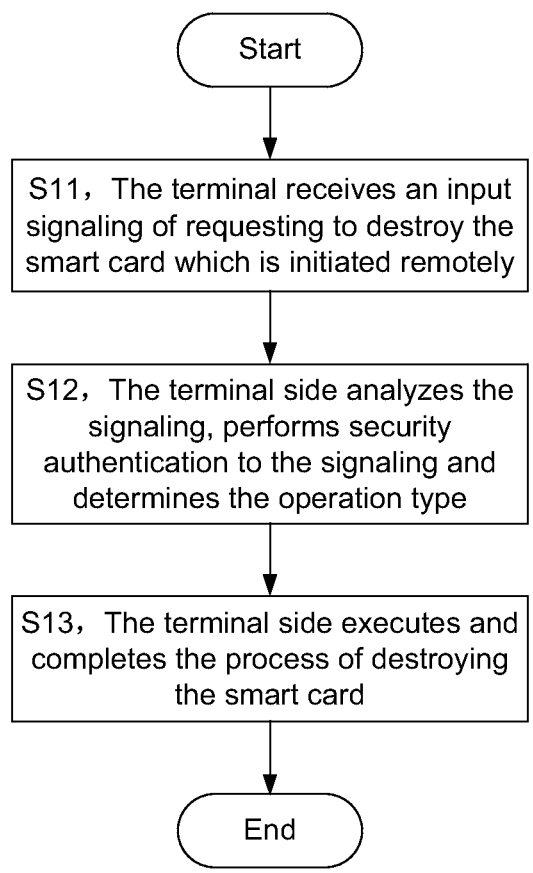
FIG. 3 shows a preferred flowchart of the method for remote control of a smart card according to an embodiment of the present application.

FIG. 3 shows a preferred flowchart of the method for remote control of a smart card according to the embodiment of the present application; as shown in FIG. 3, the method for remote control of a smart card comprises:

S11, if a smart card supervision mechanism (such as a payment system platform or the smart card management platform) finds that a subscriber uses a smart card illegally, the smart card supervision mechanism informs the mobile network platform to process this case;

S12, the smart card management platform performs short message interaction with the terminal side where the smart card is positioned via the mobile network platform to execute the destroying of the smart card; and S13, the terminal completes the destroying of the smart card.

According to one aspect of the present application, a method for destroying a smart card remotely based on electronic payment service is provided.

Figure 2:
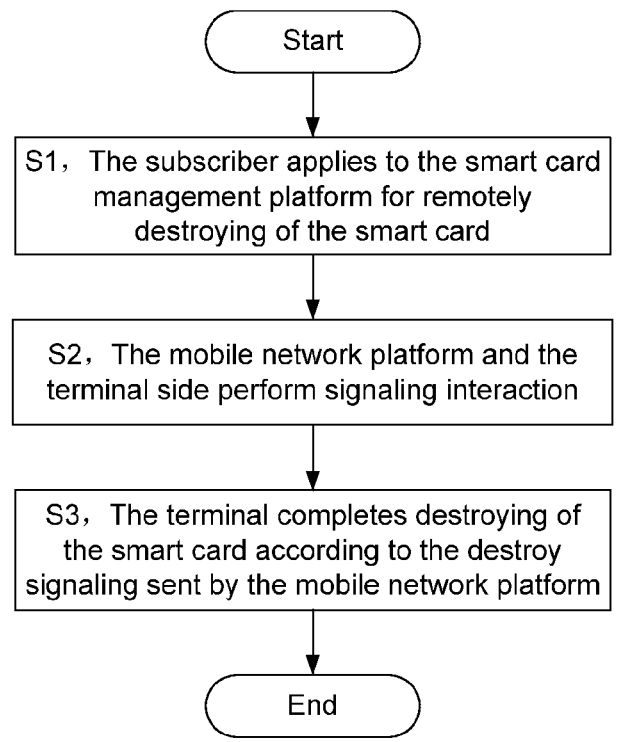
FIG. 2 shows a preferred flowchart of the method for remote control of a smart card according to an embodiment of the present application.
Figure 4:
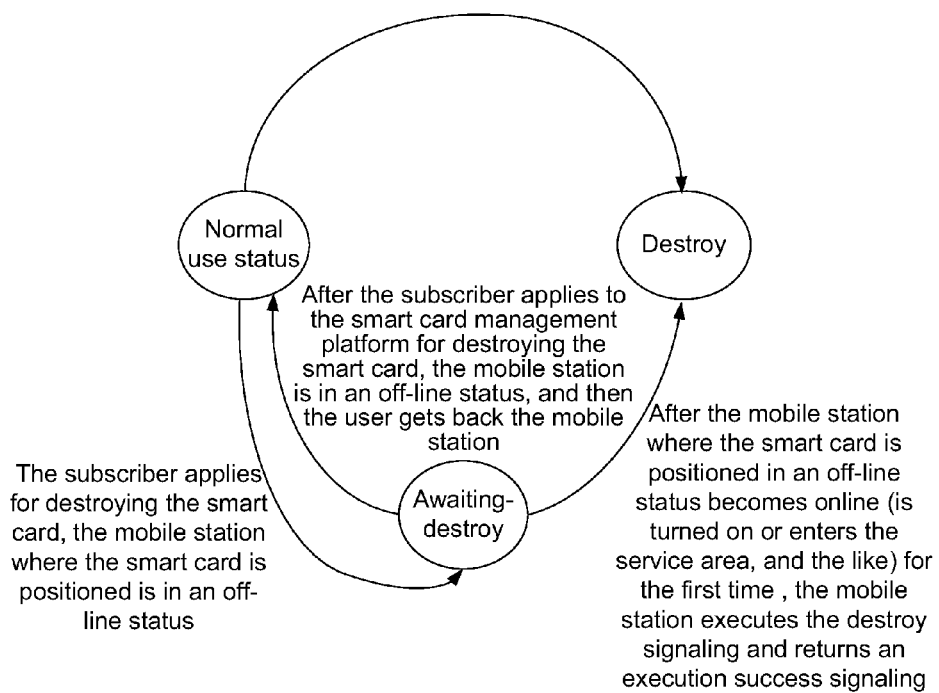
FIG. 4 shows a schematic diagram of a status machine at a network side according to an embodiment of the present application.
Figure 5:
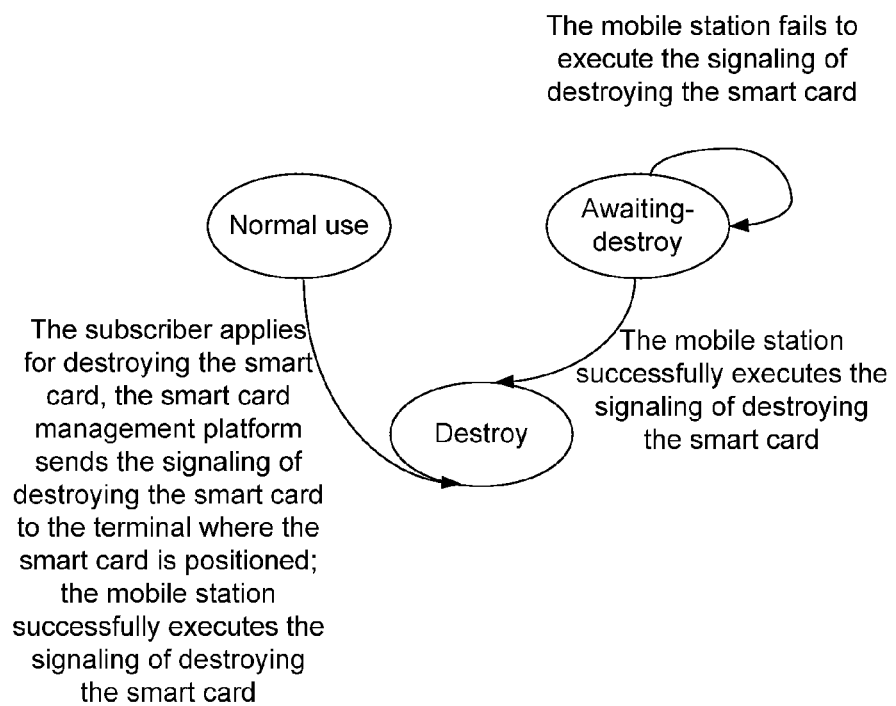
FIG. 5 shows a schematic diagram of a status machine at a terminal side according to an embodiment of the present application.

FIG. 2 shows a preferred flowchart of the method for remote control of a smart card according to the embodiment of the present application. FIG. 4 shows a schematic diagram of a status machine at a network side according to the embodiment of the present application. FIG. 5 shows a schematic diagram of a status machine at a terminal side according to the embodiment of the present application.

As shown in FIG. 2, with reference to FIG. 4 and FIG. 5, the method for remote control of a smart card comprises:

step S1, the subscriber applies to the smart card management platform for destroying the smart card;

step S2, the mobile network platform and the terminal side (the terminal, the smart card) perform interactive signaling processing; and step S3, the terminal side completes destroying the smart card.

Figure 7:
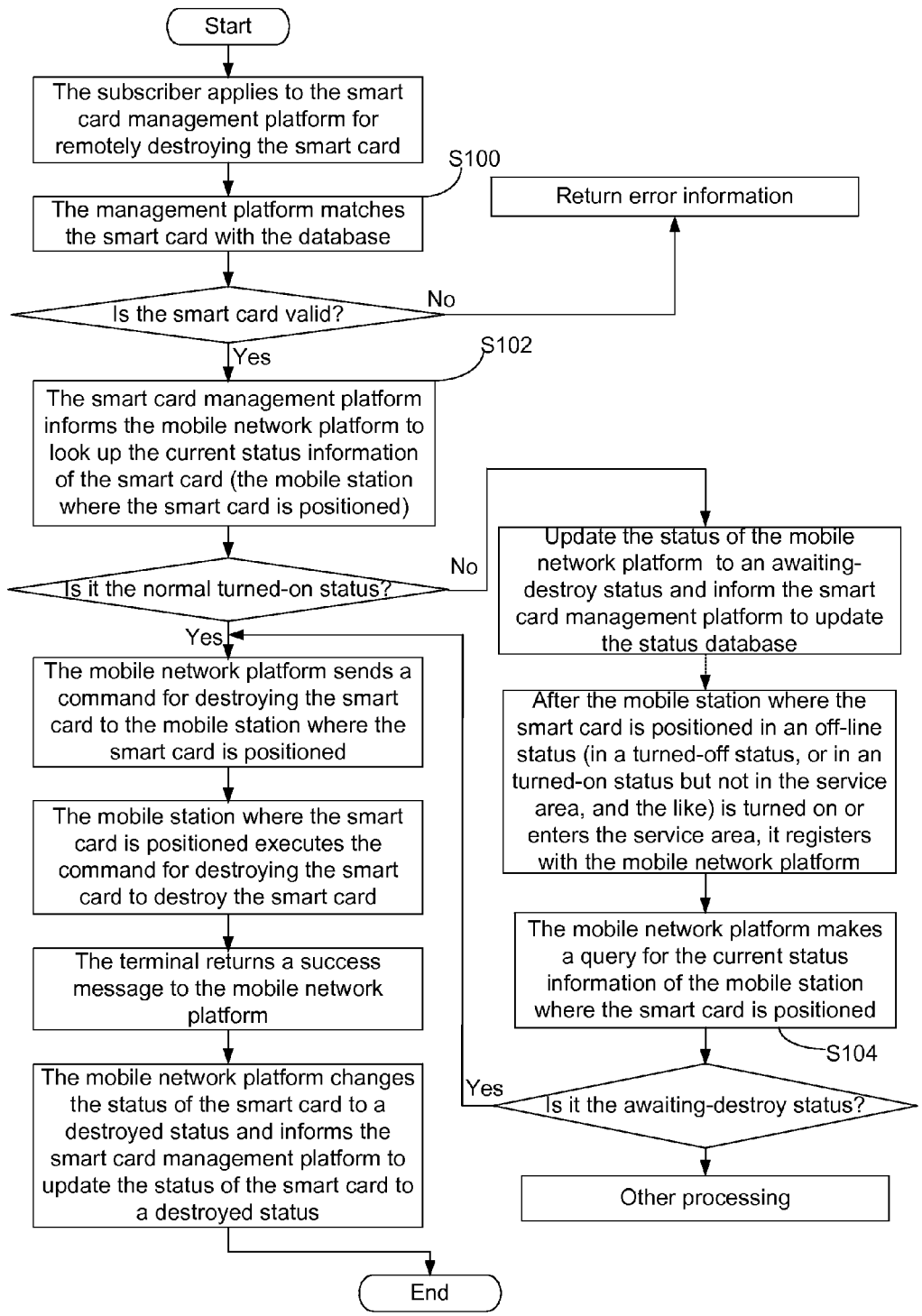
FIG. 7 shows a preferred flowchart of the method for remote control of a smart card according to an embodiment of the present application.

FIG. 7 shows a preferred flowchart of the method for remote control of a smart card according to the embodiment of the present application; with reference to FIG. 7, the step S2 may comprise the following processes:

step S100, after receiving the request to destroy the smart card sent from the subscriber to the smart card management platform, the management platform matches information of the smart card with information in the database to determine if the smart card is valid; if the smart card is invalid, then the management platform returns a failure message and the current processing flow is ended; and if the smart card is valid, then the next step is executed;

step S102, the smart card management platform looks up current status information of a mobile station where the smart card is positioned via the mobile network platform; if the mobile station where the smart card is positioned is in a normal turned-on status, then the mobile network platform directly sends a destroy command to the mobile station where the smart card is positioned, and, after the mobile station where the smart card is positioned executes the destroy command to destroy the smart card, the mobile station returns a success message to the mobile network platform, and the mobile network platform changes the status of the smart card to a destroyed status and informs the smart card management platform to update the status of the smart card to a destroyed status; if the mobile station where the smart card is positioned is in an off-line status (in a turned-off status, or in an turned-on status but not in a service area, and the like), then the mobile network platform updates its status to an awaiting-destroy status, and informs the smart card management platform to update a status database; and step S104, after the mobile station where the smart card is positioned in an off-line status (in a turned-off status, or in an turned-on status but not in a service area, and the like) is turned on or enters the service area, when it registers with the mobile network platform, the mobile network platform makes a query and finds that the mobile station where the smart card is positioned is in an awaiting-destroy status, and sends a destroy command to the mobile station where the smart card is positioned; after executing the destroy command to destroy the smart card, the mobile station returns a success message to the mobile network platform, and the mobile network platform updates theist status to a destroyed status and informs the smart card management platform to synchronously update the status database.

In the method, before the mobile station where the smart card is positioned executes the destroy command sent by the mobile network platform in step S102/S104, a security authentication should be included in order to confirm the command is the destroy command sent by the smart card management platform.

Figure 6:
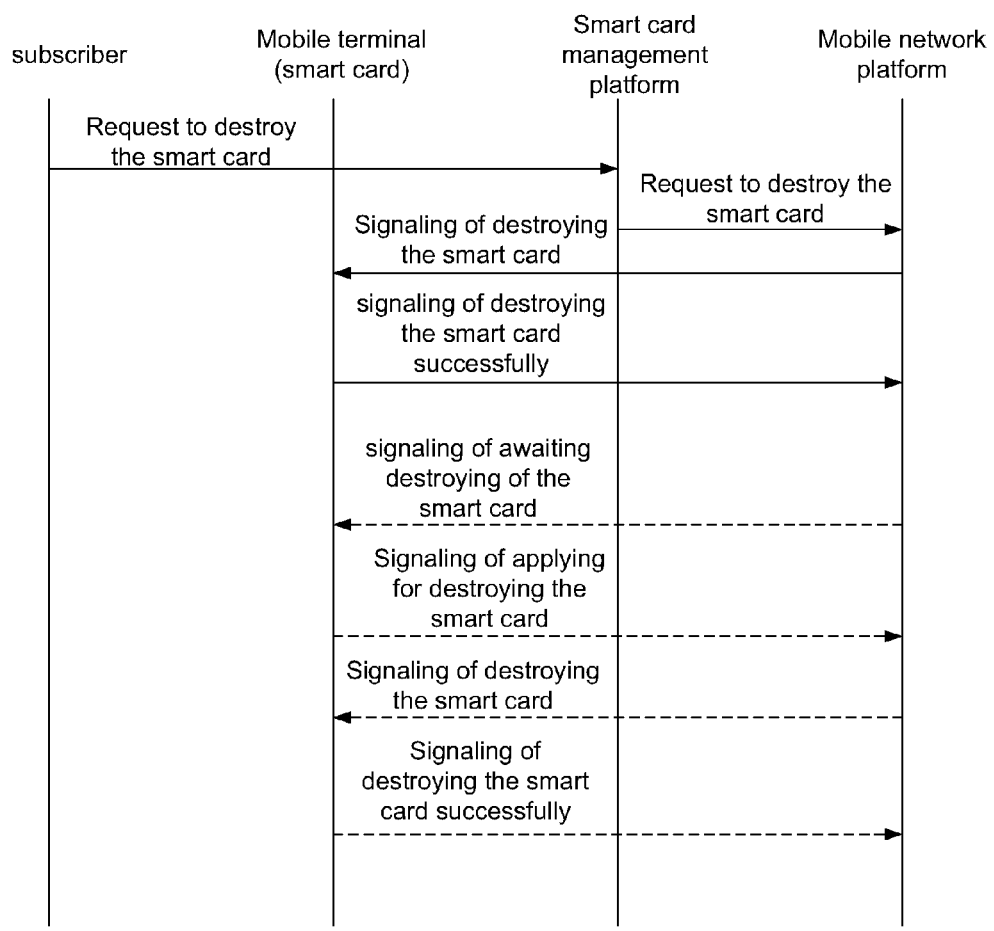
FIG. 6 shows a schematic diagram of signaling interaction in a system according to an embodiment of the present application.

FIG. 6 shows a schematic diagram of signaling interaction in a system according to an embodiment of the present application; as shown in FIG. 6, signaling interaction between a subscriber and the mobile network platform is realized through signaling as shown.

In the method, the step S102 that the mobile station where the smart card is positioned executes the destroy command to destroy the smart card comprises:

the mobile station disables the function of the smart card permanently by destroying physical (or the small card) hardware; and the mobile station destroys the smart card by executing a preinstalled software procedure (device).

When the mobile station destroys the smart card by executing a preinstalled software procedure, the preinstalled software procedure (device) can either be preinstalled in the smart card, or be preinstalled in the mobile station where the smart card is positioned.

For example, in a method for destroying a smart card by destroying hardware, the voltage of a mobile phone battery is directly applied to the power supply circuit of the smart card; since the normal voltage of the smart card is quite lower (1.8 v/3 v), while the operating voltage of a mobile terminal is generally 3.6 v to 4.2 v (other destroy methods can be employed for a card under 5 v), the smart card can be destroyed directly, and cannot be repaired.

The software procedure is preinstalled in the terminal where the smart card is positioned, and the step that the mobile station executes the destroy command is as follows:

destroying payment data in the smart card (the memory where the payment data is stored); and executing the preinstalled software procedure in the terminal to destroy a payment data smart card program in the smart card:

the software procedure is preinstalled in the smart card, and the step that the mobile station executes a command to destroy the payment data in the smart card is as follows:

copying the preinstalled software procedure in the smart card into the terminal;

destroying the payment data in the smart card (the memory where the payment data is stored); and executing the copied software procedure in the terminal, which is a back-up program of destroying the smart card.

For example, if the smart card is to be destroyed by a software program, the software program may be written to make the number of times of inputting PUK codes greater than 10, then the smart card is permanently locked and cannot be unlocked, namely the smart card is destroyed.

In step S102 that the smart card management platform looks up the current status information of the mobile station where the smart card is positioned via the mobile network platform, the mobile network platform finds the status information of the mobile station according to the mobile identification code and the location regional information of the mobile station.

Step S104, after the mobile station where the smart card is positioned in an off-line status (in a turned-off status, or in an turned-on status but not in a service area, and the like) is turned on or enters the service area, when it registers with the mobile network platform, the mobile network platform makes a query and finds that the mobile station where the smart card is positioned is in an awaiting-destroy status, and sends a destroy command to the mobile station where the smart card is positioned; after executing the destroy command to destroy the smart card, the mobile station returns a success message to the mobile network platform, and the mobile network platform updates its status to a destroyed status and informs the smart card management platform to synchronously update the status database.

According to another aspect of the present application, a method for destroying a smart card remotely based on an electronic payment service is provided (in this method, a subscriber does not need to apply, but the management platform directly handles the destroying of a smart card of the subscriber, which is corresponding to the case that the smart card is used illegally by the subscriber).

Figure 8:
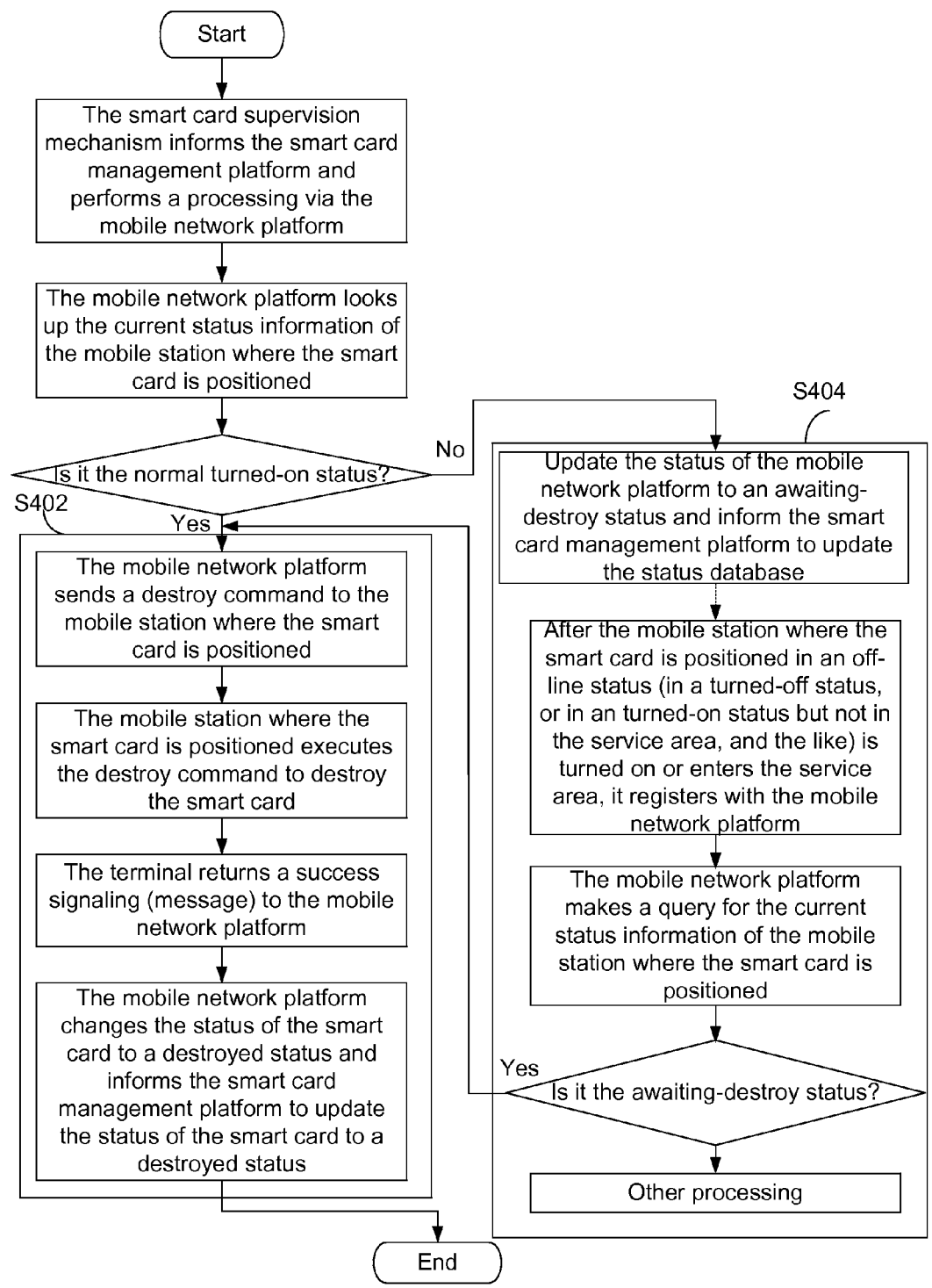
FIG. 8 shows a preferred flowchart of the method for remote control of a smart card according to an embodiment of the present application.

FIG. 3 shows a preferred flowchart of the method for remote control of a smart card according to an embodiment of the present application; FIG. 8 shows a preferred flowchart of the method for remote control of a smart card according to an embodiment of the present application.

As shown in FIG. 3, with reference to FIG. 8, the method for remote control of a smart card comprises:

S11, if the smart card supervision mechanism (such as the payment system platform or the smart card management platform) finds that a subscriber uses the smart card illegally, the smart card supervision mechanism informs the mobile network platform to process this case;

S12, the smart card management platform performs short message interaction with the terminal side where the smart card is positioned via the mobile network platform to execute the destroying of the smart card; and S13, the terminal completes the destroying of the smart card.

Wherein step S12 may comprise the following processes:

the smart card management platform looks up the current status information of the mobile station where the smart card is positioned via the mobile network platform; if the mobile station where the smart card is positioned is in a normal turned-on status, the mobile network platform sends a destroy command to the mobile station where the smart card is positioned directly: after the mobile station where the smart card is positioned executes the destroy command to destroy the smart card, the mobile station returns a success message to the mobile network platform; the mobile network platform changes the status of the smart card to a destroyed status and informs the smart card management platform to update the status of the smart card to a destroyed status; if the mobile station where the smart card is positioned is in an off-line status (in a turned-off status, or in an turned-on status but not in a service area, and the like), the mobile network platform updates its status to an awaiting-destroy status, and informs the smart card management platform to update the status database;

step S404, after the mobile station where the smart card is positioned in an off-line status (in a turned-off status, or in an turned-on status but not in a service area, and the like) is turned on or enters the service area, when it registers with the mobile network platform, the mobile network platform makes a query and finds that the mobile station where the smart card is positioned is in an awaiting-destroy status, and sends a destroy command to the mobile station where the smart card is positioned; after executing the destroy command to destroy the smart card, the mobile station returns a success message to the mobile network platform; the mobile network platform updates its status to a destroyed status and informs the smart card management platform to synchronously update the status database.

In the method, before the mobile station where the smart card is positioned executes the destroy command sent by the mobile network platform in step S402/S404, a security authentication should be included in order to confirm the command is the destroy command sent by the smart card management platform.

In the method, the step S402 that the mobile station where the smart card is positioned executes the destroy command to destroy the smart card comprises:

the mobile station disables the function of the smart card permanently by destroying physical hardware; and the mobile station destroys the smart card by executing a preinstalled software procedure (device).

When the mobile station destroys the smart card by executing a preinstalled software procedure, the preinstalled software procedure (device) can either be preinstalled in the smart card, or be preinstalled in the mobile station where the smart card is positioned.

For example, if the smart card is to be destroyed by destroying hardware, the voltage of the mobile phone battery may be directly applied to the power supply circuit of the smart card; since the normal voltage of the smart card is quite lower (1.8 v/3 v), while the operating voltage of the mobile terminal is generally 3.6 v to 4.2 v (other destroy methods can be employed for the card under 5 v), the smart card can be destroyed directly, and cannot be repaired.

The software procedure is preinstalled in the terminal where the smart card is positioned, and the step that the mobile station executes the destroy command is as follows:

destroying payment data in the smart card (the memory where the payment data is stored);

executing the preinstalled software procedure in the terminal to destroy a payment data smart card program in the smart card;

the software procedure is preinstalled in the smart card, and the step that the mobile station executes a command to destroy the payment data in the smart card is as follows:

copying the preinstalled software procedure in the smart card into the terminal;

destroying the payment data in the smart card (the memory where the payment data is stored);

executing the copied software procedure in the terminal, which is a back-up program of destroying the smart card.

For example, if the smart card is to be destroyed by a software program, the software program may be written to make the number of times of inputting PUK codes greater than 10, then the smart card is permanently locked and cannot be unlocked, namely the smart card is destroyed.

In addition, step S402, the smart card management platform looks up the current status information of the mobile station where the smart card is positioned via the mobile network platform, and the mobile network platform finds the status information of the mobile station according to the mobile identification code and the location regional information of the mobile station.

Step S404, after the mobile station where the smart card is positioned in an off-line status (in a turned-off status, or in an turned-on status but not in a service area, and the like) is turned on or enters the service area, when it registers with the mobile network platform, the mobile network platform makes a query and finds that the mobile station where the smart card is positioned is in an awaiting-destroy status, and sends a destroy command to the mobile station where the smart card is positioned; after executing the destroy command to destroy the smart card, the mobile station returns a success message to the mobile network platform; the mobile network platform updates its status to a destroyed status and informs the smart card management platform to update synchronously the status database.

According to another aspect of the present application, a device for destroying a smart card remotely based on an electronic payment service is provided, comprising:

a smart card management platform, which includes but is not limited to a smart card application management system for providing and managing applications owned by or entrusted to a smart card issuer; which further includes a smart card application provider management platform, through the system, relevant information of the smart card application provider is recorded, and service authorities of the smart card application provider and the like are specified;

a request device, which is configured to acquire a request from a subscriber;

a communication device, which is configured for a mobile network platform to process interaction between a mobile station and the mobile network platform, and process communication, data synchronization and the like between the mobile network platform and the card management platform;

an execution device, which is configured for a mobile station to execute destroying of a smart card.

The smart card includes, but is not limited to an sim card, an R-UIM card, a usim card, a csim card, a UICC card, a java card, a financial card, a traffic card, a prepaid card and combined cards of the above cards.

The mobile terminal or mobile station includes, but is not limited to a terminal such applying to GSM, CDMA, WCDMA, Td-Scdma, cdma2000, data card, fixed station, LTE, LTE+ and the like, and a multi-mode terminal of any combination thereof.

Device Embodiment

According to an embodiment of the present application, a system for remote control of a smart card is provided.

Figure 9:
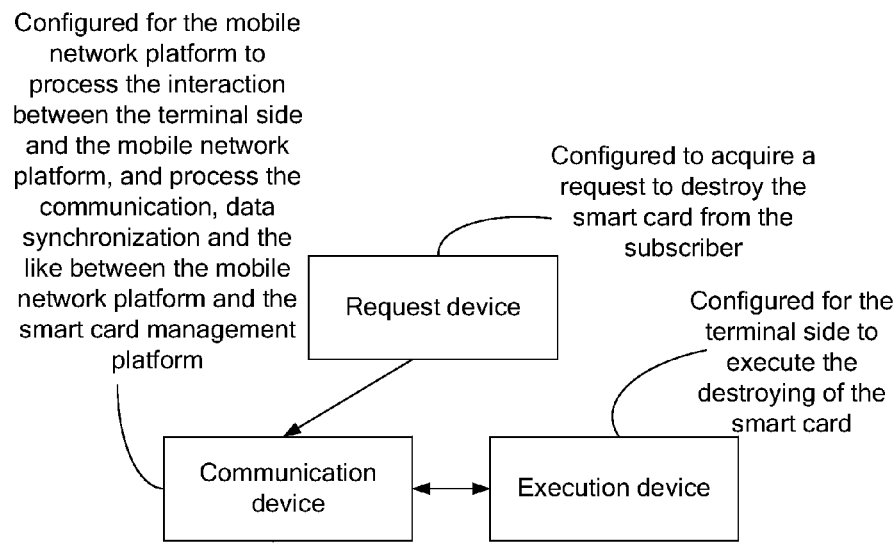
FIG. 9 shows a schematic diagram of a preferred system for remote control of a smart card according to an embodiment of the present application.

FIG. 9 shows a schematic diagram of a preferred system for remote control of a smart card according to an embodiment of the present application.

As shown in FIG. 9, the system comprises a request device, a communication device and an execution device.

Specifically, the request device is configured to acquire a request from a subscriber;

the communication device is configured for a mobile network platform to process interaction between a mobile station and the mobile network platform, for implementing communication, data synchronization and the like between the mobile network platform and the card management platform; the execution device is configured for the mobile station to destroy a smart card.

Figure 10:
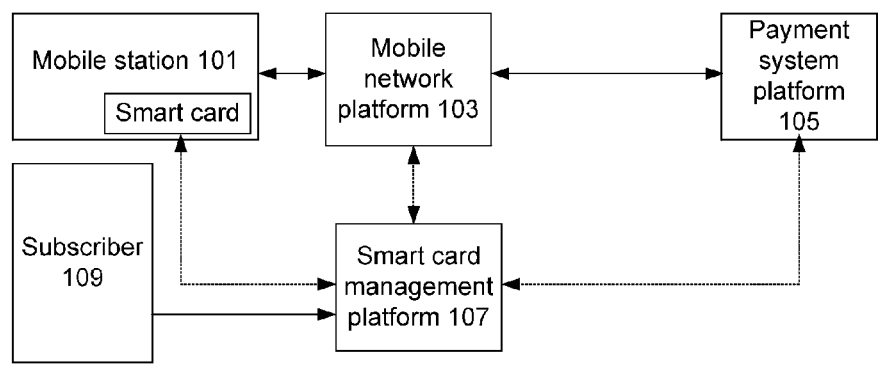
FIG. 10 shows a schematic diagram of a preferred system for remote control of a smart card according to an embodiment of the present application.

FIG. 10 shows a schematic diagram of a preferred system for remote control of a smart card according to an embodiment of the present application.

As shown in FIG. 10, the system comprises a mobile network platform 103, a mobile station 101, a smart card management platform 107, a payment system platform 105, wherein both the mobile network platform 103 and the smart card management platform 107 are connected to the payment system platform 105.

The mobile network platform 103 is configured to send a destroy command to the mobile station; and the mobile station 101 is configured to execute the destroy command to destroy the smart card.

Preferably, when a subscriber 109 applies to the smart card management platform 107 for destroying a smart card, the smart card management platform 107 looks up the current status information of the mobile station where the smart card is positioned via the mobile network platform; if the mobile station where the smart card is positioned is in a normal turned-on status, the mobile network platform 103 directly sends a destroy command to the mobile station 101 where the smart card is positioned; after the mobile station 101 where the smart card is positioned executes the destroy command to destroy the smart card, the mobile station 101 where the smart card is positioned returns a success message to the mobile network platform 103; the mobile network platform 103 changes the status of the smart card to a destroyed status and informs the smart card management platform 107 to update the status of the smart card to a destroyed status; if the mobile station 101 where the smart card is positioned is in an off-line status (in a turned-off status, or in an turned-on status but not in a service area, and the like), the mobile network platform 103 updates the status of the smart card to an awaiting-destroy status, and informs the smart card management platform 107 to update the status database.

Figure 11:
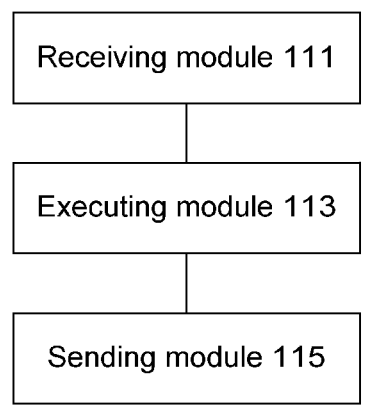
FIG. 11 shows a schematic diagram of a mobile station according to an embodiment of the present application.

FIG. 11 shows a schematic diagram of a mobile station according to an embodiment of the present application.

As shown in FIG. 11, the mobile terminal comprises: a receiving module 111, an executing module 113 and a sending module 115.

Specifically, the receiving module 111 is configured to receive a request to destroy a smart card; the executing module 113 is configured to execute the destroying of the smart card; the sending module 115 is configured to send a destroy success message.

Figure 12:
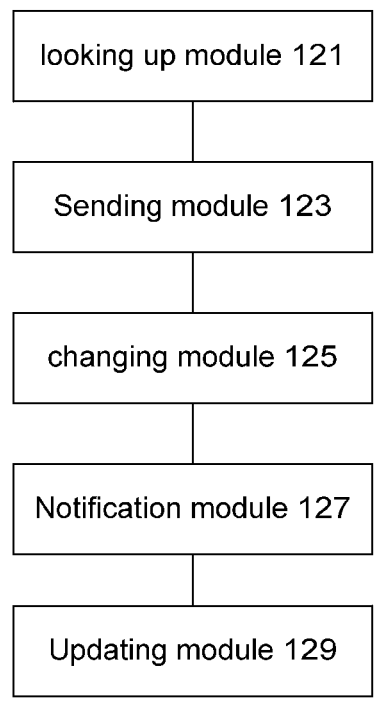
FIG. 12 shows a schematic diagram of a mobile network platform according to an embodiment of the present application.

FIG. 12 shows a schematic diagram of a mobile network platform according to an embodiment of the present application.

As shown in FIG. 12, the mobile network platform comprises: a looking up module 121, a sending module 123, a changing module 125 and an updating module 129, and may further comprise a notification module 127.

Specifically, the looking up module 121 is configured to look up the status information of the mobile station where the smart card is positioned; the sending module 123 is configured to, when the status information of the mobile station indicates that the mobile station is in a normal use status, send a destroy command to the mobile station; the changing module 125 is configured to change the status of the smart card to a destroyed status; the notification module 127 is configured to inform the smart card management platform to update the status of the smart card to a destroyed status; the updating module 129 is configured to, when the status information indicates that the mobile station where the smart card is positioned is in an off-line status, update its status to an awaiting-destroy status.

It can be seen from the above description that the present application can avoid the loss caused when a subscriber terminal for payment is robbed, lost, stolen, or is used illegally seriously, and provides a higher flexibility to the payment system.

The above are only preferred embodiments of the present application and not intended to limit the present application, and those skilled in the art can make various alternations and changes to the present application. Any modifications, equivalent replacements, improvements and the like within the spirit and principle of the present application shall fall within the scope of protection of the present application.

The invention claimed is:

1. A method for remote control of a smart card which is included in a mobile station, comprising:
   receiving, by a smart card management platform, a request to destroy the smart card;
   wherein the smart card management platform stores dynamic data indicative of operation statuses of the smart card, and the operation statuses of the smart card comprising a normal use status, a destroyed status and an awaiting-destroy status;
   responsive to said request, querying, by the smart card management platform, a current operation status of the mobile station using the mobile station's identification and location information through a mobile network platform, wherein the operation statuses of the mobile station comprise an on-line status and an off-line status;
   performing, by the smart card management platform, signaling interaction with the mobile station via a mobile network platform to control the mobile station to destroy the smart card based on a result of said query; and in response changing the status of the smart card accordingly; wherein the performing signaling interaction comprises:
   sending, by the smart card management platform via the mobile network platform, a destroy command to destroy the smart card to the mobile station in response to the query result; and in response a destroy success message returned from the mobile station, changing the status of the smart card from the normal use status to the destroyed status accordingly;
   updating, by the smart card management platform, the status of the smart card from the normal use status to the awaiting-destroy status in response to the query result of the mobile station being in the off-line status; and in response to the mobile station being in the on-line status and the smart card having the awaiting-destroy status registered at the smart card management platform, sending a destroy command to destroy the smart card to the mobile station via the mobile network platform; and in response to a destroy success message returned from the mobile station, changing the status of the smart card from the awaiting-destroy status to the destroyed status accordingly;
   wherein when the mobile station receives a destroy command via the mobile network platform the mobile station disables function of the smart card by destroying hardware of the smart card; or the mobile station disables the function of the smart card by executing a preinstalled software procedure.

2. The method according to claim 1, wherein the off-line status comprises:
   the mobile station is in a turned-off status;
   or the mobile station is not in a service area.

3. The method according to claim 1, further comprising: after the smart card management platform receives the request, determining, by the smart card management platform, whether the smart card is valid or not.

4. The method according to claim 1, further comprising: before the smart card management platform performs signaling interaction with the mobile station via the mobile network platform, performing security authentication between the mobile network platform and the mobile station.

5. The method according to claim 1, wherein the request to destroy the smart card is received from a subscriber; or
   the request to destroy the smart card is received from a smart card supervision platform which finds that a subscriber uses the smart card illegally.

6. A system for remote control of a smart card, comprising: a mobile network platform of a mobile network, a smart card management platform and a mobile station;

wherein the mobile station, in which the smart card is located, comprises an antenna, and is configured to execute the destroy command to destroy the smart card by destroying hardware of the smart card or by executing a preinstalled software procedure;

wherein the smart card management platform stores dynamic data indicative of operation statuses of the smart card, and the operation statuses of the smart card comprising a normal use status, a destroyed status and an awaiting-destroy status;

wherein the smart card management platform is configured to:

responsive to said request, query, by the smart card management platform, a current operation statuses of the mobile station using the mobile station's identification and location information through the mobile network platform, wherein the operation statuses of the mobile station comprise an on-line status and an off-line status;

perform signaling interaction with the mobile station via a mobile network platform to control the mobile station to destroy the smart card based on a result of said query; and in response changing the status of the smart card accordingly; wherein the performing signaling interaction comprises:

sending via the mobile network platform, a destroy command to destroy the smart card to the mobile station in response to the query result; and in response a destroy success message returned from the mobile station, changing the status of the smart card from the normal use status to the destroyed status accordingly;

updating the status of the smart card from the normal use status to the awaiting-destroy status in response to the query result of the mobile station being in the off-line status; and in response to the mobile station being in the on-line status and the smart card having the awaiting-destroy status registered at the smart card management platform, sending a destroy command to destroy the smart card to the mobile station via the mobile network platform; and in response to a destroy success message returned from the mobile station, changing the status of the smart card from the awaiting-destroy status to the destroyed status accordingly.

7. A system for remote control of a smart card, comprising:
a mobile network platform of a mobile network and a smart card management platform;

wherein the mobile network platform of the mobile network comprises circuitry;

wherein the smart card management platform stores dynamic data indicative of operation statuses of the smart card, and the operation statuses of the smart card comprising a normal use status, a destroyed status and an awaiting-destroy status;

wherein the smart card management platform is configured to:

responsive to said request, query, by the smart card management platform, a current operation statuses of the mobile station using the mobile station's identification and location information through the mobile network platform, wherein the operation statuses of the mobile station comprise an on-line status and an off-line status;

perform signaling interaction with the mobile station via a mobile network platform to control the mobile station to destroy the smart card based on a result of said query and in response changing the status of the smart card accordingly; wherein the performing signaling interaction comprises:

sending via the mobile network platform, a destroy command to destroy the smart card to the mobile station in response to the query result; and in response a destroy success message returned from the mobile station, changing the status of the smart card from the normal use status to the destroyed status accordingly;

updating the status of the smart card from the normal use status to the awaiting-destroy status in response to the query result of the mobile station being in the off-line status; and in response to the mobile station being in the on-line status and the smart card having the awaiting-destroy status registered at the smart card management platform, sending a destroy command to destroy the smart card to the mobile station via the mobile network platform; and in response to a destroy success message returned from the mobile station, changing the status of the smart card from the awaiting-destroy status to the destroyed status accordingly.

\* \* \* \* \*

UNITED STATES PATENT AND TRADEMARK OFFICE
CERTIFICATE OF CORRECTION

PATENT NO.       : 8,718,603 B2
APPLICATION NO.  : 13/258796
DATED            : May 6, 2014
INVENTOR(S)      : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1 days.

Signed and Sealed this
Twenty-ninth Day of September, 2015

Michelle K. Lee
*Director of the United States Patent and Trademark Office*